United States Patent
Ito et al.

(10) Patent No.: US 8,038,206 B2
(45) Date of Patent: Oct. 18, 2011

(54) OPERATING LEVER OF VEHICULAR SEAT

(75) Inventors: Makoto Ito, Aichi-ken (JP); Yoshihiro Ooishi, Kariya (JP); Tomohiro Muramatsu, Nagoya (JP); Robert Day, Northfield Township, MI (US); Osamu Fujimoto, Nisshin (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 235 days.

(21) Appl. No.: 12/439,891

(22) PCT Filed: Sep. 4, 2007

(86) PCT No.: PCT/JP2007/067188
§ 371 (c)(1),
(2), (4) Date: Jun. 5, 2009

(87) PCT Pub. No.: WO2008/029791
PCT Pub. Date: Mar. 13, 2008

(65) Prior Publication Data
US 2010/0207417 A1    Aug. 19, 2010

(30) Foreign Application Priority Data

Sep. 8, 2006 (JP) ................................. 2006-243914

(51) Int. Cl.
*B60N 2/36* (2006.01)
(52) U.S. Cl. ............................ 297/15; 297/331; 297/336
(58) Field of Classification Search .................... 297/15, 297/331, 332, 333, 334, 336
See application file for complete search history.

(56) References Cited

U.S. PATENT DOCUMENTS

| 5,527,087 A | 6/1996 | Takeda et al. |
| 5,570,931 A | 11/1996 | Kargilis et al. |
| 5,588,707 A | 12/1996 | Bolsworth et al. |
| 5,662,368 A * | 9/1997 | Ito et al. .................... 297/336 X |

(Continued)

FOREIGN PATENT DOCUMENTS

| JP | 7-061271 | 3/1995 |
| JP | 2004-106640 A | 4/2004 |
| JP | 2005-225376 A | 8/2005 |

OTHER PUBLICATIONS

English language Abstract of JP 7-061271, Mar. 7, 1995. English language Abstract of JP 2004-106640 A, Apr. 8, 2004.
English language Abstract of JP 2005-225376 A, Aug. 25, 2005.
U.S. Appl. No. 12/065,371, Andou et al., filed Feb. 29, 2008.
U.S. Appl. No. 12/357,787, Mitsuhashi, filed Jan. 22, 2009.
U.S. Appl. No. 12/439,347, Ito et al., filed Feb. 27, 2009.

*Primary Examiner* — Rodney B White
(74) *Attorney, Agent, or Firm* — Greenblum & Bernstein, P.L.C.

(57) ABSTRACT

An operating lever is provided at one of a front face, an upper face, and a back face of a seat including a seat cushion and a seat back. The operating lever may include a first lever having a first end and a second end, and a second lever having a first end and a second end. The second end of the first lever and the first end of the second lever may be pivotably connected to each other, and the first end of the first lever may be pivotably connected to the seat such that the first lever is configured to change an attitude of the seat. In addition, the second end of the second lever may be formed as an operating portion, and when the operating portion is operated in a direction away from the seat, the first lever and the second lever pivot may away from the seat and the attitude of the seat is adjusted.

8 Claims, 5 Drawing Sheets

U.S. PATENT DOCUMENTS

| | | | |
|---|---|---|---|
| 5,951,086 A * | 9/1999 | Hoshino et al. | 297/336 X |
| 6,123,380 A * | 9/2000 | Sturt et al. | 297/15 X |
| 6,345,856 B1 * | 2/2002 | Minai | 297/336 X |
| 6,523,899 B1 * | 2/2003 | Tame | 297/331 |
| 6,644,730 B2 * | 11/2003 | Sugiura et al. | 297/15 |
| 7,264,293 B2 * | 9/2007 | Fischer et al. | 297/336 X |
| 7,393,056 B2 * | 7/2008 | O'Connor | 297/336 X |
| 7,497,511 B2 * | 3/2009 | Park et al. | 297/15 |
| 2006/0066123 A1 | 3/2006 | Tsujibayashi et al. | |
| 2009/0051202 A1 | 2/2009 | Ozeki et al. | |

* cited by examiner

OPERATING LEVER OF VEHICULAR SEAT

TECHNICAL FIELD

The present invention relates to an operating lever of a vehicular seat provided at a back face of a seat back of a vehicular seat arranged in a vehicle or the like, connected to a lock mechanism for changing an attitude state of a seat for operating to release lock of the lock mechanism.

BACKGROUND ART

As an operating lever of a vehicular seat of this kind, there is, for example, Patent Reference 1. In Patent Reference 1, an operating lever is provided at a storing seat arranged at the rearmost row of a vehicle and capable of being stored to a storing recess portion for storing the seat recessed on a rear side of a vehicular floor when not used. The operating lever is constituted by a member having a section substantially in an L-like shape provided at an upper position of a back face of a seat back, exposed to outside on a side of the back face of the seat back at one end side thereof, and connected with a wire on an inner side of the seat back at other end side thereof. Further, the one end side pivotably held around an axial shaft and exposed to the side of the back face of the seat back is urged in a direction of being proximate to the seat by a spring member.
Patent Reference 1: JP-A-2004-106640

The operating lever of Patent Reference 1 is a member having an L-like shaped section, the other end is only pivoted around the axial shaft on the one end side, when the seat back falls to a front side of the vehicle by pivoting the operating lever to release the lock by the lock mechanism by way of the wire. Also the operating lever is moved to the front side in accordance therewith, and therefore, there poses a problem that the hand of a user grabbing the operating lever is pulled.

Thus, there is a need in the art for an operating lever of a vehicular seat releasing lock by a lock mechanism by operating an operating lever and preventing the hand of a user from being abruptly pulled when a seat back falls to a front side of a vehicle.

SUMMARY OF THE PRESENT INVENTION

An operating lever of a vehicular seat of the invention is provided at a front face, an upper face, or a back face of a seat including a seat cushion and a seat back, and includes a first lever and a second lever. The first lever and the second lever are axially supported pivotably by each other on one end sides in length directions of the two levers. Other end side in the length direction of the first lever is axially supported pivotably by the seat, and the axially supported other end side is connected to a lock mechanism capable of changing a state of an attitude of the seat by way of a connecting member. Other end side in the length direction of the second lever is formed as an operating portion. The attitude of the seat can be operated while bending the first lever in two stages around axial shafts on sides of both ends in the length direction by operating the operating portion of the second lever in a direction of being remote from the seat.

Between the first lever and the second lever, an urge force of bringing the first lever and the second lever into a state of being folded to each other is urged, and the first lever is urged with an urge force in a direction of being proximate to the seat. When the operating lever is not used, the first and the second levers overlap each other at inside and outside thereof, and a thickness of the operating lever becomes equal to a thickness of the first or the second lever.

The seat is formed with a recess portion capable of containing the operating lever. When the operating lever is not used, it is preferable to contain the operating lever at inside of the recess portion of the seat in a state of being substantially flush with a surface of the seat.

It is preferable that a bottom face of the recess portion formed at the seat for containing the operating lever is formed by a shape in which a depth dimension from a surface of the seat differs by a location, and when the operating lever is not used, the operating portion of the second lever faces the deepest portion of the recess portion of the seat.

It is preferable to set a pivoting limit angle of the second lever larger than a pivoting limit angle of the first lever.

It is preferable that a side end of the second lever is formed with a flange formed to project to an outer side to be equal to or larger than a width dimension of the first lever, and when the operating lever is not used, the first lever is covered from the outer side by the flange of the second lever.

It is preferable to constitute the second lever to be expandable and contractable in the length direction.

When the vehicular seat is made to be able to be contained in the storing recess portion recessed on a rear side of a vehicular floor, it is preferable to arrange the operating lever at a lower position of the back face of the vehicular seat.

ADVANTAGE OF THE INVENTION

According to the operating lever of the invention, the second lever is axially supported pivotably by the first lever, and the operating lever can be operated in a direction of being remote from the seat while being bent in two stages, and therefore, for example, even when lock by the lock mechanism is released by operating the operating lever and the seat back is made to fall to a front side of the vehicle, an angle of the second lever relative to the first lever is changed, a distance between the operating portion of the second lever grabbed by the user and the seat back is prolonged, and therefore, a degree of pulling the hand of the user can be restrained. The operating lever is bent in the two stages, and therefore, the state of the attitude of the seat can be operated by applying a force by an arbitrary angle easy for the user, and therefore, an operability thereof is high. Further, even when the seat is operated from a tail gate on the rear side of the vehicle, by connecting the second lever to the first lever, an amount of projecting the operating lever in a direction of being remote from the seat is increased, and an operation at a position further proximate to the user can be carried out.

When the first lever and the second lever are urged to a state of being folded to each other, the first and the second levers overlap each other at inside and outside thereof when not used, and a thickness of the operating lever becomes equal to a thickness of the first or the second lever, space saving formation can be achieved without increasing a thickness of an amount of adding the second lever, and an outlook thereof is also excellent. An urge force in a direction of making the first lever proximate to the seat is loaded on the hand by way of the second lever, and therefore, when the attitude of the seat is operated by the urge force, the hand is alleviated from being pulled. An urge force in a direction of folding the second lever can be adjusted to an angle the most easy for the user (angle easy to apply force), and therefore, an influence of the urge force can be reduced.

When the seat is formed with the recess portion capable of containing the operating lever and the operating lever is contained at inside of the recess portion in a state of being substantially flush with the surface of the seat when not used, the outlook of the seat can be promoted when the operating lever is not used. Further, in a case of providing the operating lever at the back face of the seat back, even when a luggage or the like is mounted on the seat in a state of making the seat back falls to the front side of the vehicle, the luggage or the like can stably be mounted without constituting a hindrance by the operating lever.

In a case in which the operating portion of the second lever faces the deepest portion of the recess portion of the seat when the operating lever is not used, a large space of inserting the hand of the user is provided, and therefore, the operating portion is easy to be grabbed, and the second lever can easily be operated in a direction of being remote from the seat.

The first lever is a lever mainly for releasing lock. On the other hand, the second lever is a lever mainly for operating the attitude of the seat. Hence, when a pivoting limit angle of the second lever is set to be larger than a pivoting limit angle of the first lever, the second lever is displaced more than the first lever and the seat. Thereby, there can be achieved an effect of capable of precisely alleviating the hand from being pulled when the attitude of the seat is operated, capable of making the operating portion disposed at a position the most proximate from the user, capable of operating the operating lever by the user by an easy attitude even from any position, angle, regardless of the attitude of the seat and the like. Further, by adjusting a relative positional relationship (relative angle) of the first lever and the second lever, the operation can be carried out in a state of making a direction of releasing the first lever and a direction of moving the storing seat coincide with each other, and therefore, the force can efficiently be applied.

In a case of covering the first lever by a flange of the second lever when the operating lever is not used, the operating lever constituted by two members looks to be a single member, an integral feeling is produced and a design performance is promoted.

When the second lever is made to be expandable and contractable, an amount of projecting the operating lever from the seat can further be increased as necessary and operability is promoted. Particularly, an operation from a tail gate becomes easy to carry out.

When the operating lever is arranged at a position on a lower side of the back face of the seat capable of containing the operating lever at a storing recess portion on a rear side of a vehicular floor, even in a case of operating the operating lever from a tail gate on the rear side of the vehicle, the operating lever becomes proximate to the user, and therefore, it is not necessary for the user to considerably lean the body forward and the operation becomes easy.

BEST MODE FOR CARRYING OUT THE INVENTION

Although an explanation will be given of an embodiment in which an operating lever of a vehicular seat according to the invention is applied to a storing seat in reference to the drawings as follows, a position of arranging the operating lever, a kind of a seat applied therewith, a mode of an operating lever or the like is not limited thereby, and the invention can naturally be changed variously without changing the scope of the invention.

Embodiment 1

Figure 1:
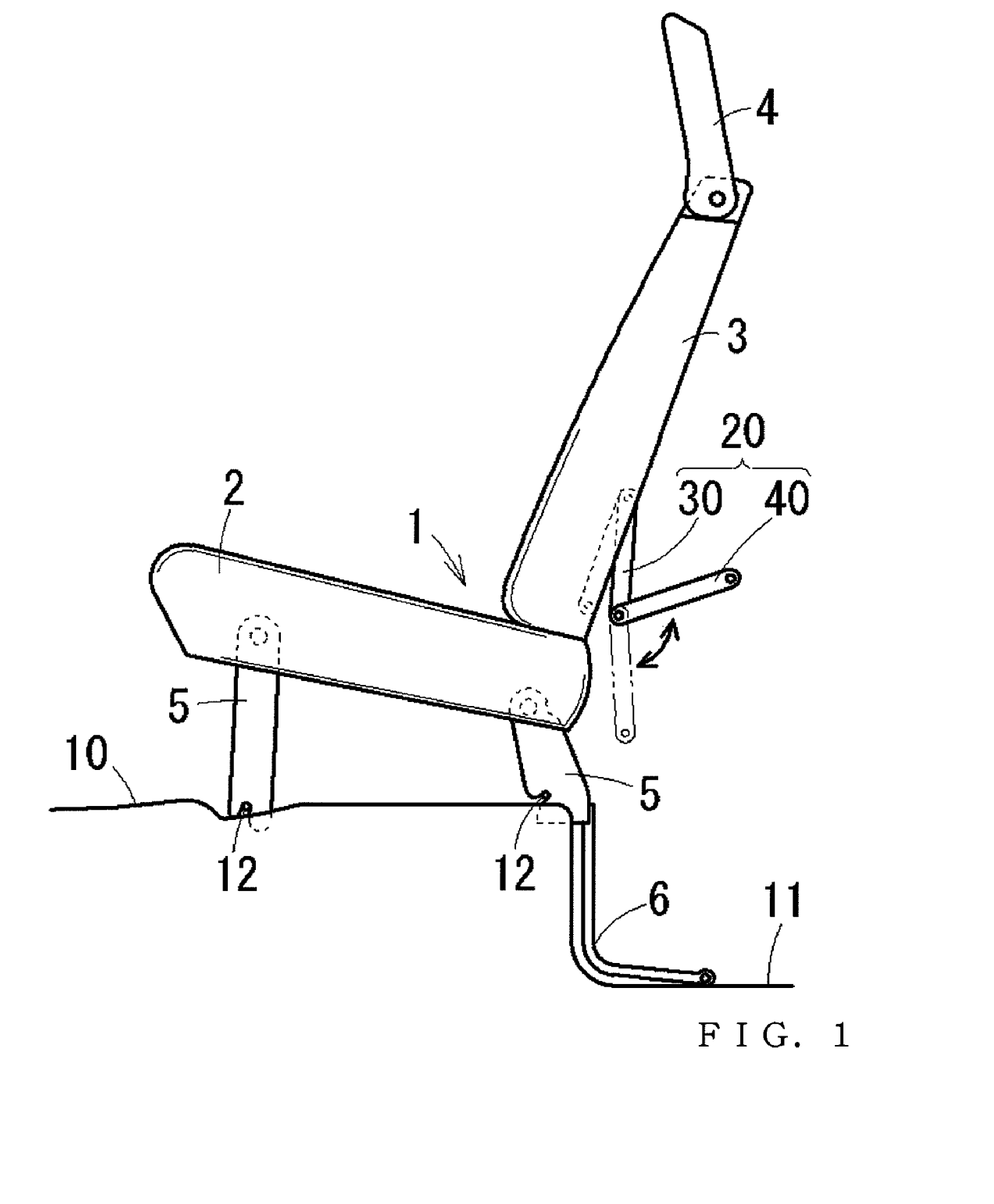
FIG. 1 is a side view of a storing seat including an operating lever.
Figure 7:
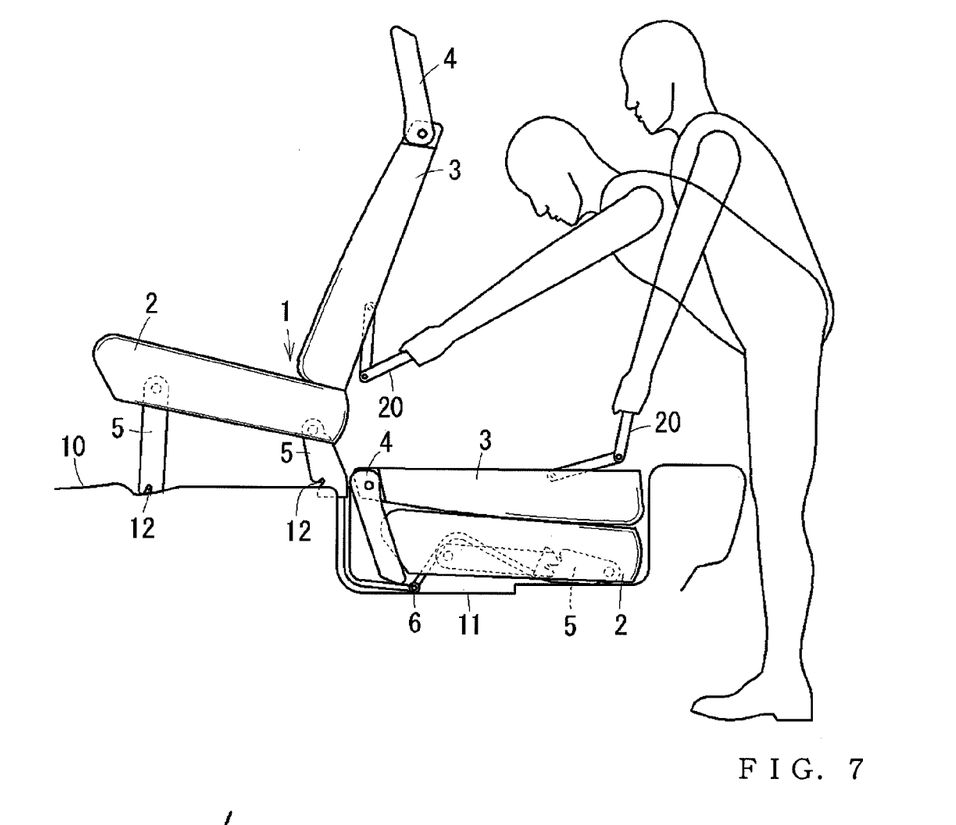
FIG. 7 is a side view showing a mechanism of operating to store and return a storing seat from a tail gate.

As shown by FIG. 7, a vehicular seat 1 in Embodiment 1 constitutes a storing seat displaceable between a using position disposed above a vehicular floor 10 and a nonusing position of being stored inside of a storing recess portion 11 recessed on a rear side of the vehicular floor 10 for storing the seat. As shown by FIG. 1, the storing seat 1 includes a seat cushion 2 constituting a seating portion, a seat back 3 constituting a back rest, a head rest 4 for supporting the head portion, and pairs of left and right legs 5, 5 for supporting the storing seat 1 from a lower face thereof on front and rear sides thereof. The two legs 5 on the rear side of the vehicle are connected with link members 6 displaceably supporting the storing seat 1 between a using position and the storing position respectively pivotably between the two legs 5 and a bottom face of the storing recess portion 11. By the two left and right link members 6, the storing seat 1 is made to be displaceable stably between the using position and the nonusing position. The seat back 3 is pivotably connected to the seat cushion 2 by way of a reclining mechanism, not illustrated, between an erecting attitude in a using state being erected on the seat cushion 2 and a nonusing state constituting an attitude of lying on a seat face of the seat cushion 2. Also the head rest 4 is pivotably connected to the seat back 3 by way of a pivoting mechanism, not illustrated, between an erecting attitude of a using state, and a nonusing state constituting an attitude of lying to a front side of a vehicle substantially by 90 degrees. The seat back 3 and the head rest 4 maintain the using attitudes by lock mechanisms, not illustrated, respecitively in correspondence therewith. Also the respective legs 5 attached to a lower face of the seat cushion 2 are attached pivotably to the storing seat 1. At the using position of the storing seat 1, the respective legs 5 support the storing seat 1 in the erecting state, and front ends for pivoting thereof are engaged with strikers 12, 12 provided on the vehicular floor 10 and using states thereof are maintained by lock mechanisms, not illustrated. On the other hand, at the nonusing position of the storing seat 1, the respective legs 5 are brought into a folding attitude of lying on a lower face side of the seat cushion 2. Also shown in FIG. 1, an operating lever 20 is provided at a lower position of the back face of the seat back 3. The operating lever 20 is connected to the respective lock mechanisms of the seat back 3, the head rest 4, and the respective legs 5 by way of wires, not illustrated, at an inner portion of the storing seat 1. The wires are connecting members for connecting the operating lever 20 and the respective lock mechanisms. By operating the operating lever 20, the seat back 3, the head rest 4, and the respective legs 5 can be displaced from the using states to the nonusing states.

As shown in FIG. 1 and the like, the operating lever 20 includes a first lever 30 and a second lever 40, and the first lever 30 and the second lever 40 are axially supported to each other on one end sides in length directions of the two levers 30, 40 such that the first lever 30 and the second lever 40 are made to be able to be folded to pivot. An other end side in the length direction of the first lever 30 is axially supported pivotably by the storing seat 1, and is connected to the respective lock mechanisms of the storing seat 1 by way of the wires at the other end side. The other end side in the length direction of the second lever 40 is formed as an operating portion of the operating lever 20 and is formed in a grip shape to be easy to grab by hand. Between the first lever 30 and the second lever 40, an urge force for bringing the first lever 30 and the second lever 40 into a state of being folded to each other is urged, and an urge force in a direction of been proximate to the storing seat 1 is urged at the first lever 30. In this way, the operating lever 20 of Embodiment 1 is made to be able to operate the attitude of the storing seat 1 by bending the first lever 30 in two stages around axes at both ends in the length direction, by operating an operating portion of the second lever in a direction of being remote from the storing seat 1 by including the first lever 30 pivotably attached to the seat back 3, and the second lever 40 connected to the pivoting front end side of the first lever 30 pivotably relative to the first lever 30. As is well shown in FIGS. 4 through 6, the operating lever 20 is provided at inside of the recess portion 15 recessed to form at the back face of the seat back 3.

As described above, the first lever 30 is a member connected to the respective lock mechanisms at an inside of the storing seat 1 on a pivoting base end side thereof for operating to release the respective lock mechanisms. On the other hand, in an operation of releasing the lock or an operation of displacing the seat, the second lever 40 is a member for pertinently adjusting angles thereof. In this meaning, in the following, the first lever 30 is referred to as a releasing lever, and the second lever 40 is referred to as an angle adjusting lever.

Figure 2:
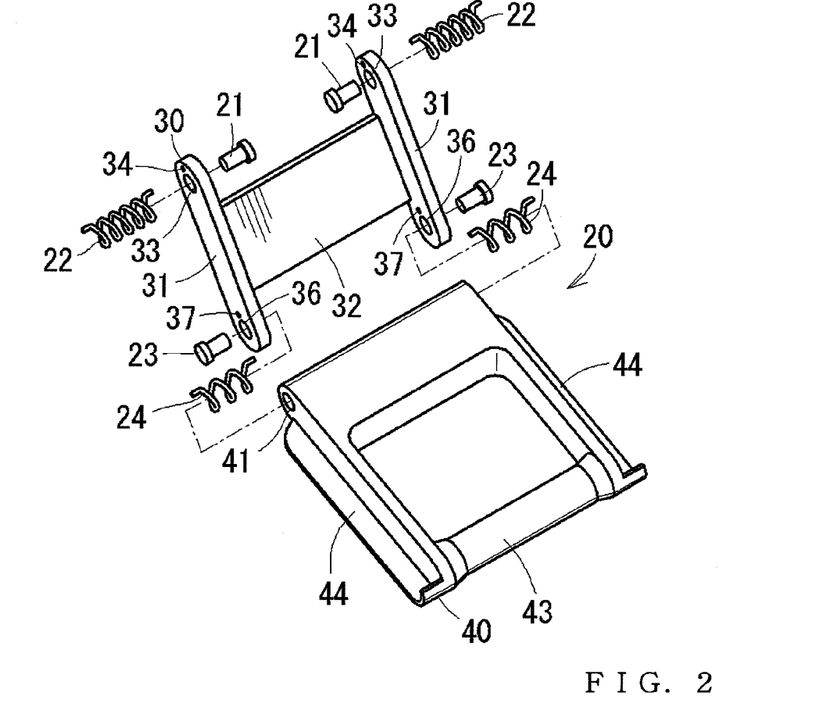
FIG. 2 is a disassembled perspective view of an operating lever.

The releasing lever 30 is a synthetic resin mold product in an H-like shape in a front view thereof and is constituted by two pieces of stays 31, 31 in a slender thin plate shape aligned opposedly, and a bridging plate 32 in a thin plate shape of bridging the two stays 31, 31 as is well shown in FIG. 2. The bridging plate 32 is integrally provided at a center portion in a longitudinal direction of the stay 31 on one end side in a short direction thereof. Through holes 33 are bored at portions of the two stays 31, 31 proximate to other ends in the longitudinal directions. By inserting a pin 21 to the through hole 33 and a locking hole (not illustrated) of the seat back 3, the releasing lever 30 is made to be pivotable by constituting a pivoting axis center of the pin 21. Further, torsional coil springs 22 are fitted to be mounted to fixing holes 34 bored at vicinities of the through holes 33 of the two stays 31, 31 and fixing holes (not illustrated) bored at insides of the locking holes of the seat back 3 at positions relative to the fixing holes 34. By the torsional coil springs 22, the releasing lever 30 is urged in a direction of being proximate to the seat back 3 and a limit pivoting the releasing lever 30 to the seat back 3 is restricted.

Also the angle adjusting lever 40 is a synthetic resin mold product and includes an opening at a position eccentric to a side of an operating portion. Locking holes 41 are bored at outer faces of both sides of the angle adjusting lever 40. Through holes 36 are bored in a penetrated state at portions of the releasing lever 30 proximate to the one ends in longitudinal directions of the two stays 31, 31 and at positions facing the locking holes 41. Further, by fitting engage pins 23 to the locking holes 41 by way of the through holes 36 of the releasing lever 30, the angle adjusting lever 40 is made to be pivotable relative to the releasing lever 30 by constituting pivoting centers by the pins 23. Torsional coils 24 are arranged also around the pins 23 between the releasing lever 30 and the angle adjusting lever 40 in a state of being disposed at insides of the locking holes 41. Both ends of the torsional coil springs 24 are respectively engaged with fixing holes 37 bored at the releasing lever 30 and fixing holes (not illustrated) bored at insides of the locking holes 41 of the angle adjusting lever 40. Thereby, the angle adjusting lever 40 is urged in a direction of being proximate to the seat back 3 and a limit of pivoting to the fixing lever 30 is restricted. A pitch of the torsional coil spring 24 of restricting the limit of pivoting the angle adjusting lever 40 is larger than a pitch of the torsional coil spring 22 of restricting the limit of pivoting the releasing lever 30 (turn number is smaller). Thereby, a pivoting limit angle of the angle adjusting lever 40 is larger than a pivoting limit angle of the releasing lever 30. The pivoting limit angle of the angle adjusting lever 40 according to Embodiment 1 is set to about 200 degrees relative to the releasing lever 30.

Figure 3:
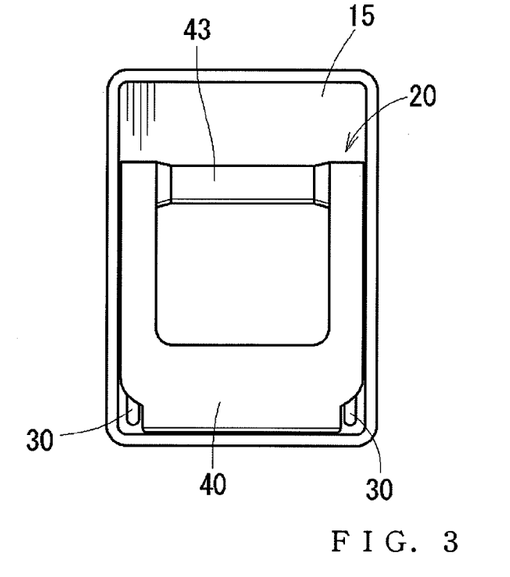
FIG. 3 is a front view of an operating lever.

As is well shown in FIG. 3, an operating portion disposed on the pivoting front end side of the angle adjusting lever 40 constitutes a grip 43 formed in a shape of a circular pillar. Both side ends of the angle adjusting lever 40 are formed with flanges 44 to project to outer sides by an amount equivalent to a width dimension of the stay 31 of the releasing lever 30 from pivoting base ends thereof over to pivoting front ends thereof. A left and right width dimension of the angle adjusting lever 40 is set to a dimension of being contained just between the two stays 31, 31 of the releasing lever 30. Thereby, when the operating lever 20 is not used, by urge forces of the torsional coil springs 22, 24, a state of containing the angle adjusting lever 40 to an inner side of the releasing lever 30 to overlap at inside and outside thereof is brought about. At this occasion, by bringing the flanges 44 of the angle adjusting lever 40 and the stays 31, 31 of the releasing lever 30 into contact with each other, a thickness dimension of the operating lever 20 becomes a thickness dimension substantially equal to that of the two levers 30, 40. When the operating lever 20 is not used, the releasing lever 30 is covered from outside by the flanges 44 and is not recognized from outside.

The recess portion 15 formed to recess to the back face of the seat back 3 of containing the operating lever 20 has a shape in which a depth dimension of a bottom face thereof from a surface of the seat back 3 differs by a location thereof. Specifically, as is well shown in FIG. 4, the recess portion 15 is constituted by a recess portion 15a of a deep bottom significantly recessed substantially in a triangular shape in a section thereof, and a flat recess portion 15b of a shallow bottom continuous to a lower side of the recess portion 15a of the deep bottom, showing substantially a shape of a spoon in a side view of the section. When the operating lever 20 is not used, the grip 43 of the angle adjusting lever 40 is disposed at a center portion in an up and down direction constituting the deepest portion of the recess portion 15a of the deep bottom.

Figure 4:
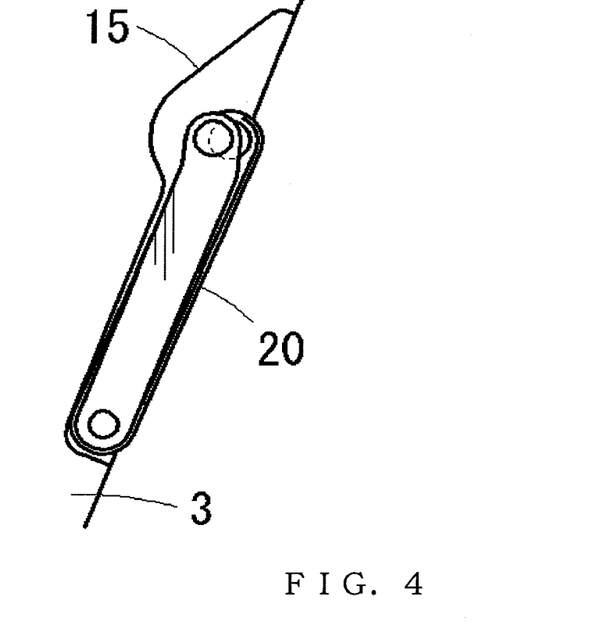
FIG. 4 is a side view showing a state of not using an operating lever.
Figure 5:
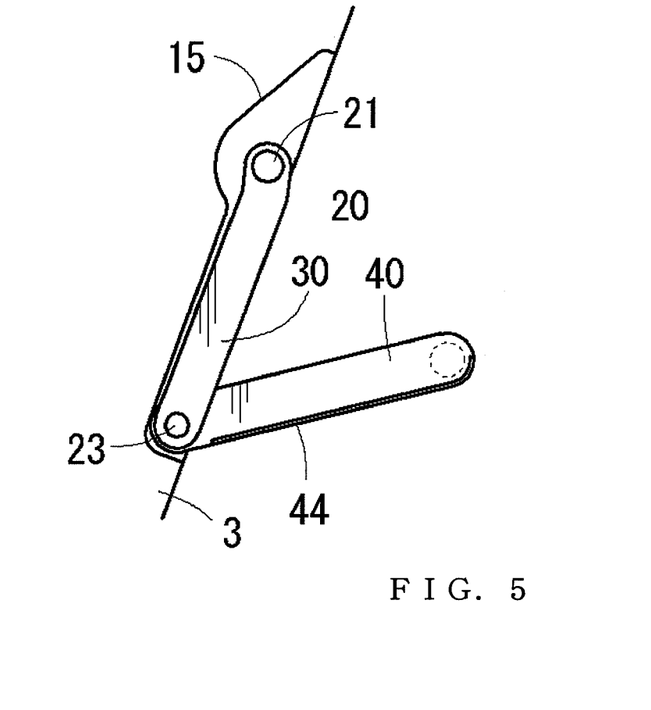
FIG. 5 is a side view of a state of operating only a second lever.
Figure 6:
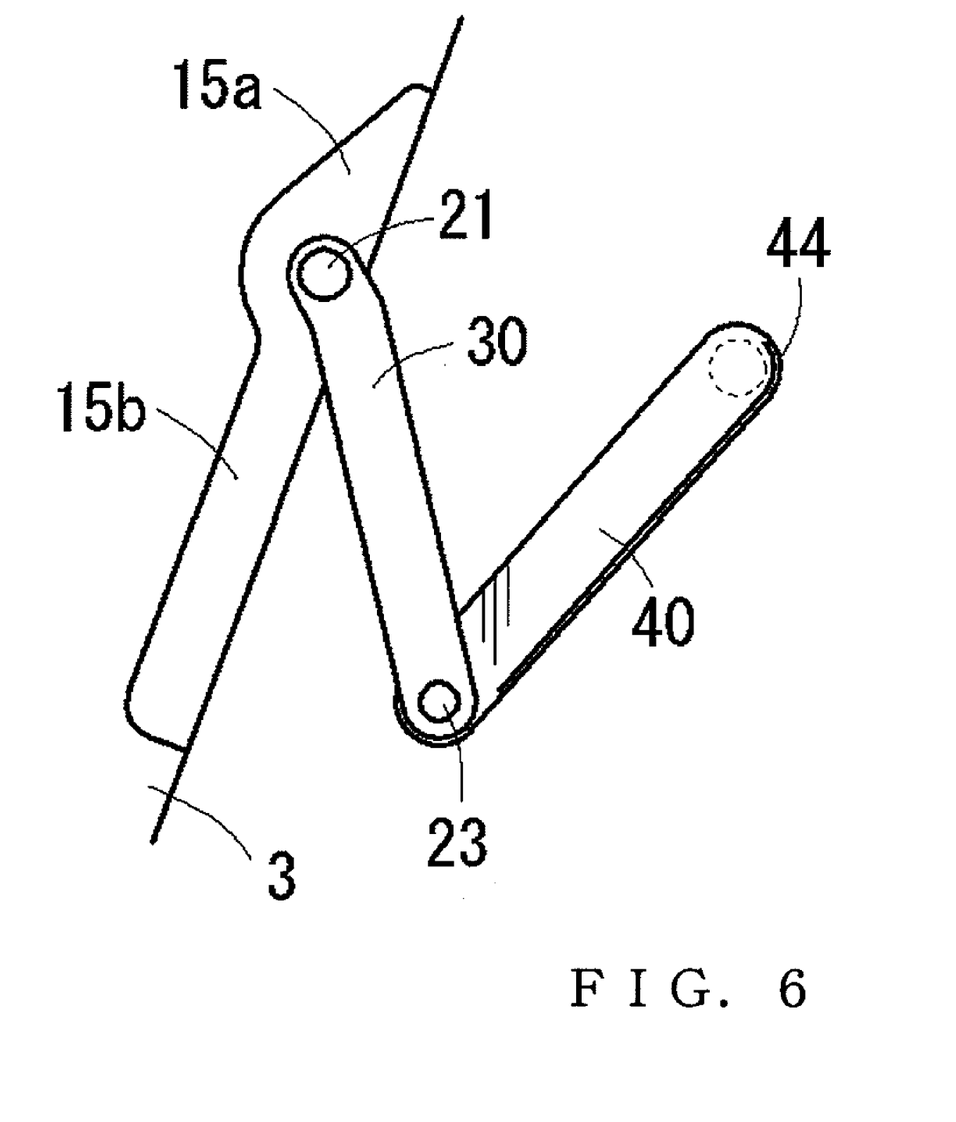
FIG. 6 is a side view showing a state of using an operating lever.

Next, a lock releasing operation of the seat 1 by the operating lever 20 of the embodiment will be explained in reference to FIGS. 4 through 6. In the nonusnig state shown in FIG. 4, the operating lever 20 is contained in the recess portion 15 in a state of being substantially flush with the back face of the seat back 3 in a state of overlapping the releasing lever 30 and the angle adjusting lever 40 at inside and outside thereof. In this state, a hand is brought from the portion of the recess portion 15a of the deep bottom and grabs the grip 43 of the angle adjusting lever 40. Further, as shown by FIG. 5, the angle adjusting lever 40 is pulled to separate therefrom to the rear side of the seat back 3 to be erect from inside of the recess portion 15 while being pivoted centering on the pin 23. At this time, the respective lock mechanisms of the storing seat 1 are not released. Next, as shown by FIG. 7, the releasing lever 30 is pivoted centering on the pin 21 by pulling the angle adjusting lever 40 further to separate therefrom to the rear side of the seat back 3, and the respective lock mechanisms of the storing seat 1 are released. In accordance therewith, the seat back 3, the head rest 4, and the respective legs 5 are respectively displaced to the nonusing attitudes, and therefore, the storing seat 1 can be stored to inside of the storing recess portion 11 as shown by FIG. 7 by moving the storing seat 1 to the rear side of the vehicle. Finally, when the grip 43 grabbed by the hand is detached, the operating lever 20 is automatically contained to inside of the recess portion 15 by the urge forces of the springs 22 and 24.

At this occasion, even when the lock is released by the operating lever 20 and the seat back 3 is made to fall to the front side of the vehicle, the angle of the angle adjusting lever 40 relative to the releasing lever 30 is changed and a distance between the grip 43 of the angle adjusting lever 40 grabbed by the user and the seat back 3 is prolonged, and therefore, a degree of pulling the hand of the user is restrained. The angle adjusting lever 40 can be pivoted relative to the releasing lever 30 by 180 degrees or more and can be bent in two stages, and therefore, a degree of freedom of the releasing operation angle is large, and a user can carry out a releasing operation even in the angle that is easy for a hand. Further, even when operated from the tail gate on the rear side of the vehicle, as shown by FIG. 7, the recess portion 15 for the operating lever 20 is provided at a position on the lower side of the seat back 3, and an amount of projecting the operating lever 20 is increased by a length dimension of the angle adjusting lever 40, thereby, it is not necessary for the user to lean the body forward, a burden on the waist is small or the like and the operation becomes easy. At that occasion, the burden on the hand is reduced by operating the urge force of the releasing lever 30 by way of the angle adjusting lever 40. Further, also the burden can further be reduced by adjusting the angle of the angle adjusting lever 40 and firmly grabbing the grip 43. Further, although a direction of storing the storing seat 1 and a direction of releasing the releasing lever 20 do not coincide with each other (reverse direction), by making the angle adjusting lever 40 able to bend in two stages, the direction of storing the storing seat 1 and a direction of operating the angle adjusting lever 40 coincide with each other, and therefore, the storing operation can be carried out without difficulty while applying the force efficiently.

When the storing seat 1 is returned from the storing position to the using position, an operation reverse to the above-described may be carried out, and the operation is basically similar to the above-described operation. However, in this case, a direction of urging the angle adjusting lever 40 and a direction of returning the storing seat 1 do not coincide with each other. In order to avoid this, the returning operation may be carried out in a state of pivoting the angle of lever 40 up to a position of at least 180 degrees or more relative to the releasing lever 30.

Embodiment 2

Figure 8:
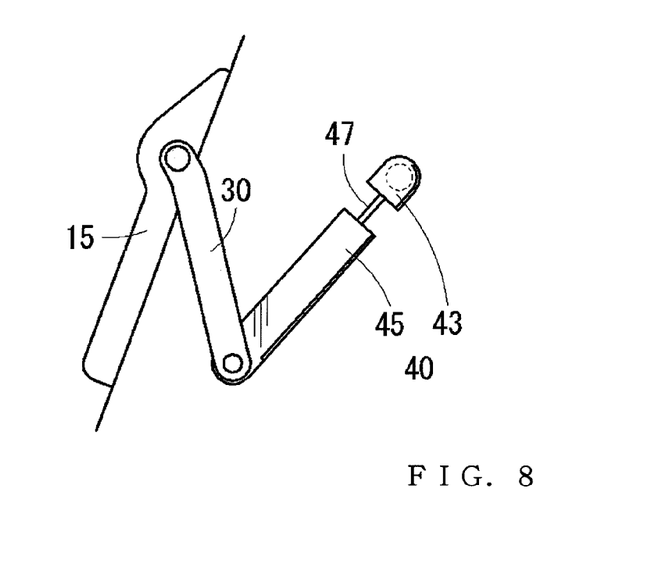
FIG. 8 is a side view showing Embodiment 2 of an operating lever.

FIG. 8 is a side view showing Embodiment 2 of an operating lever of a vehicular seat of the invention. The embodiment is characterized in that the angle adjusting lever 40 is constituted to be expandable and contractable in a length direction thereof and a lever length of a position of the grip 43 is able to be changed. Specifically, the angle adjusting lever 40 is constituted by two members of the grip portion 43 and a lever base portion 45. An expanding and contracting mechanism thereof is not particularly limited but a well-known expanding and contracting mechanism can be applied thereto. For example, a mechanism or the like of forming left and right sides of the lever base portion 45 in a shape of a hollow cylinder can be used, inserting guide rods 47 integrally elongated from left and right sides of the grip 43, and is capable of being expanded and contracted in steps by engaging a hook, not illustrated with a plurality of stages of locking portions provided at inside of the lever base portion. The other is similar to that of Embodiment 1 mentioned above, and therefore, the same members are attached with the same notations and an explanation thereof will be omitted.

Other Embodiment

Although according to Embodiment 1 and Embodiment 2 mentioned above, an explanation has been given of the invention of applying the operating lever 20 of the invention to the storing seat 1, the invention is not limited thereto but may be applied to, for example, a seat of a second row or a driver's seat or a passenger's seat or the like in the vehicle. Further, although the operating lever 20 is connected to the respective lock mechanism of the seat back 3, the head rest 4, the legs 5 by way of the wires, the operating lever 20 may be connected to one or two thereof, and the operating lever 20 can also be connected to a lock mechanism of other member. Further, the operating lever 20 is not provided to the back face of the seat back 3 but can be applied to a tip up lever on a vehicle front end side of the seat cushion 2, or can also be applied to a tilt down lever at an upper end of the seat back 3.

The recess portion 15 provided at the back face of the seat back 3 for containing the operating lever 20 may be constituted by various shapes, for example a triangular shape in a section thereof and a semicircular shape in a section thereof other than a spoon shape in a section thereof. A depth face thereof may be flat. Further, a position of forming the recess portion 15 may be provided on an upper side of a middle of the seat back 3 in an up and down direction.

Although the limit of pivoting the angle adjusting lever 40 is preferably set to at least 180 degrees or more (preferably, 190 through 200 degrees) relative to the releasing lever 30, the pivoting limit may be less than 180 degrees relative to the releasing lever 30 depending on a portion of installing or a direction of operating the operating lever 20, or the pivoting limit may not be restricted. Further, the limit of pivoting the releasing lever 30 and the angle adjusting lever 40 can also be restricted by a member or a constitution other than the torsional coil spring. A state of hanging the angle adjusting lever 40 from the releasing lever 30 may be constituted by not using the torsional coil spring 24 of urging the releasing lever 30 and the angle adjusting lever 40 to the folded state.

The state of containing the releasing lever 30 and the angle adjusting lever 40 at inside and outside thereof in a nonusing state of the operating lever 20 can also be constituted by a type of containing the releasing lever 30 to an inner side of the angle adjusting lever 40.

The invention claimed is:

1. An operating lever that is provided at one of a front face, an upper face, and a back face of a seat including a seat cushion and a seat back, the operating lever comprising:
   a first lever having a first end and a second end; and
   a second lever having a first end and a second end,
   wherein the second end of the first lever and the first end of the second lever are pivotably connected to each other,
   wherein the first end of the first lever is pivotably connected to the seat such that the first lever is configured to change an attitude of the seat, wherein the second end of the second lever is formed as an operating portion, and wherein when the operating portion is operated in a direction away from the seat, the first lever and the second lever pivot away from the seat and the attitude of the seat is adjusted.

2. The operating lever according to claim 1, wherein the second lever is biased towards the first lever to be retained in a folded state, wherein the first lever is biased towards the seat, and wherein when the operating lever is not used, the first lever and the second lever overlap each other in the folded state such that a thickness of the operating lever equals a thickness of at least one of the first and the second lever.

3. The operating lever according to claim 2, wherein a side end of the second lever is formed with a flange configured to project to an outer side of the second lever and to be at least equal to a width dimension of the first lever, and wherein when the operating lever is not used, the first lever is covered by the flange of the second lever.

4. The operating lever according to claim 1, wherein the seat is formed with a recess portion capable of containing the operating lever, and wherein when the operating lever is not used, the operating lever is disposed within the recess portion in a state of being substantially flush with a surface of the seat.

5. The operating lever according to claim 4, wherein a bottom face of the recess portion is configured such that a depth dimension from the surface of the seat differs by a location along the bottom face, and wherein when the operating lever is not used, the operating portion of the second lever faces a deepest portion of the recess portion.

6. The operating lever according to claim 1, wherein a pivoting limit angle of the second lever is set to be larger than a pivoting limit angle of the first lever.

7. The operating lever according to claim 1, wherein the second lever is configured to be extendible and contractible in a length direction thereof.

8. The operating lever according to claim 1, wherein the vehicular seat is configured to be stored in a storing recess portion recessed on a rear side of a vehicular floor, and wherein the operating lever is arranged at a position on a lower side of the back face of the vehicular seat.

* * * * *